United States Patent
Bury

(10) Patent No.: US 8,379,743 B2
(45) Date of Patent: Feb. 19, 2013

(54) METHOD AND APPARATUS FOR INTERFERENCE MITIGATION IN A BASEBAND OFDM RECEIVER

(75) Inventor: Andreas Bury, Dresden (DE)

(73) Assignee: Blue Wonder Communications GmbH, Dresden (DE)

( * ) Notice: Subject to any disclaimer, the term of this patent is extended or adjusted under 35 U.S.C. 154(b) by 281 days.

(21) Appl. No.: 12/875,693

(22) Filed: Sep. 3, 2010

(65) Prior Publication Data

US 2011/0058618 A1    Mar. 10, 2011

(30) Foreign Application Priority Data

Sep. 4, 2009  (EP) ..................................... 09169450

(51) Int. Cl.
   *H04L 27/28*    (2006.01)
(52) U.S. Cl. ........ 375/260; 375/316; 375/229; 375/232; 375/230; 375/231; 375/267; 375/347; 375/346; 375/285
(58) Field of Classification Search .................. 375/260, 375/316, 229, 232, 230, 231, 267, 347, 346, 375/349, 285
   See application file for complete search history.

(56) References Cited

U.S. PATENT DOCUMENTS

| 2007/0076805 | A1 | 4/2007 | Kullari |
| 2009/0235116 | A1* | 9/2009 | Tan et al. ........................ 714/15 |
| 2011/0051858 | A1* | 3/2011 | Salvekar et al. ............. 375/341 |

OTHER PUBLICATIONS

Boner L. et al: "FPGA Implementation of an Iterative Receiver for MIMO-OFDM Systems"; IEEE Journal on selected Areas in communications, vol. 26, No. 6; (Aug. 1, 2008).

Haene S. et al: "A real-time 4-stream MIMO-OFDM Transceiver: System Design, FPGA Implementation, and Characterization"; IEEE Journal on selected Areas in communications, vol. 26, No. 6; (Aug. 1, 2001).

* cited by examiner

*Primary Examiner* — Siu Lee
(74) *Attorney, Agent, or Firm* — Heslin Rothenberg Farley & Mesiti P.C.; Victor A. Cardona, Esq.

(57) ABSTRACT

A method of compensating interference of received symbols in a MIMO OFDM receiver employs MMSE equalization and LLR scaling, and a MIMO OFDM receiver includes a linear MMSE equalizer. The method provides a low-complexity, numerically robust method for compensating interference of received symbols and provides a low-cost, robust digital baseband receiver for MIMO-OFDM, achieved by merging linear MMSE equalization and scaling of the corresponding equalized symbols into a single algorithm that, for the 2×M MIMO case, completely avoids computationally extensive matrix inversion and allows for significant simplification of symbol detection as compared to separate equalization and scaling.

10 Claims, 3 Drawing Sheets

METHOD AND APPARATUS FOR INTERFERENCE MITIGATION IN A BASEBAND OFDM RECEIVER

CROSS REFERENCE TO RELATED APPLICATIONS

This application claims priority from European Application No. 09169450.5 filed on Sep. 4, 2009, the entire disclosure of which is incorporated herein by reference.

The present invention relates to a method of compensating interference of received symbols in a multiple-input multiple-output (MIMO) orthogonal frequency division multiplexing (OFDM) receiver and in particular to a method which comprises applying a minimum mean squared error (MMSE) equalization technique and a log likelihood ratio (LLR) scaling technique to received symbols to obtain equalized and scaled symbols as an input for a decoder of the OFDM receiver. The invention also relates to a MIMO OFDM receiver comprising a linear MMSE equalizer.

3GPP LTE (3rd Generation Partnership Project Long Term Evolution) is the upcoming standard of 4th generation radio access networks. It employs Orthogonal Frequency Division Multiplexing (OFDM) as a downlink modulation scheme. Multiple transmit antennas at the base station side and the mandatory requirement of multiple receive antennas at the mobile terminal side, i.e. user equipment, permit simultaneous transmission of multiple data streams, or data layers, from one base station to one mobile terminal. This transmission method is known as Multiple-Input Multiple-Output (MIMO) OFDM.

In most practical situations there will be interference between the simultaneously received data streams, asking for some means of interference mitigation. Performance investigations made during development of the 3GPP LTE standard indicate that a linear equalizer designed according to the Minimum Mean Squared Error (MMSE) criterion yields a satisfactory receiver performance, at least in closed-loop scenarios. Much work has been done to efficiently implement linear MMSE equalizers. It is widely accepted that an MMSE equalizer for MIMO OFDM is implemented based on a matrix inversion which involves some computational complexity. Additionally, care has to be taken in practical implementations of MMSE equalizers with respect to numerical accuracy and sensitivity to round off errors.

Johan Eilert, Di Wu and Dake Liu: "Efficient Complex Matrix Inversion for MIMO Software Defined Radio"; IEEE International Symposium on Circuits and Systems (ISCAS) 2007, New Orleans, May 27-30, 2007, Page 2610-2613, and Shingo Yoshizawa, Yasushi Yamauchi and Yoshikazu Miyanaga; "VLSI Implementation of a Complete Pipeline MMSE Detector for a 4×4 MIMO-OFDM Receiver", IEICE Transactions on Fundamentals of Electronics, Communications and Computer Sciences 2008 E91-A(7), p. 1757-1762, focus on efficient implementation of the matrix inverse for MIMO OFDM receivers, US patent application US2009097598A1 describes Q-R decomposition of the channel matrix and successive interference cancellation comprising decision feedback using the MMSE criterion. This work is not directly comparable to linear MMSE equalization without decision feedback. Beside this recent literature on MMSE equalizers for MIMO-OFDM a lot of work is available on MMSE equalizers in the context of other transmission schemes like serial transmission, wideband CDMA, etc., or to mitigate interference caused by impacts like fast time-variation of the channel in OFDM, and so on, Some papers address numerical problems of the matrix inverse using, e.g., a Cholesky decomposition of the matrix to be inverted, or a Q-R decomposition.

State-of-the-art decoders for binary error correcting codes like convolutional codes, turbo codes, or low density parity check codes, are fed with log likelihood ratios at their input interface. For a single received bit, a log likelihood ratio is the natural logarithm of the ratio of the likelihood functions that the originally transmitted bit was either "1" or "0". The likelihood function is the probability density of the received value, conditioned on the transmitted bit being either "1" or "0", For a received value (y) containing information about a bit (b), the log likelihood ratio becomes $$LLR(b|y) = \frac{p_{y|b}(y|b=1)}{p_{y|b}(y|b=0)}.$$

Assuming a transmitted symbol (x) is taken from a QAM constellation with (m) constellation points, $x \in \{x_i | i=1 \ldots m\}$, carrying $\log_2(m)$ bits, and considering a single subcarrier in an OFDM transmission, where the received value (y) is $y = h \cdot x + n$, with (h) being a complex channel coefficient and (n) being added complex Gaussian noise of variance $\sigma_n^2$, the log likelihood ratio of bit number (k) is obtained as $$LLR(b_k|y) = \frac{\sum_{i|b_k=1} \exp(-|y - h \cdot x_i|^2 / \sigma_n^2)}{\sum_{i|b_k=0} \exp(-|y - h \cdot x_i|^2 / \sigma_n^2)}.$$

The sums in the enumerator and denominator are over all possible constellation points where the bit $b_k$ is 1 or 0, respectively.

As an example, for a QPSK constellation, $x \in \{1+i, 1-i, -1+i, -1-i\}/\sqrt{2}$ and corresponding bit mapping $(b_1, b_2) \in \{(0,0), (0,1), (1,0), (1,1)\}$, the log likelihood ratios simplify to $LLR(b_1|y) = -\sqrt{8}/\sigma_n^2 \cdot \text{Re}\{h^* \cdot y\}$ and $LLR(b_2|y) = -\sqrt{8}/\sigma_n^2 \cdot \text{Im}\{h^* \cdot y\}$, A QAM demapper supporting a number of different QAM alphabets can be implemented in such a way that it delivers properly scaled log likelihood ratios, irrespective of the QAM constellation, if the input data is scaled in the same manner for all QAM constellations. So to properly adjust the scaling it is sufficient to consider only one simple QAM constellation, like a QPSK constellation.

Besides equalization, scaling of the equalizer output data as described above is needed to achieve a fair weighting between different equalized symbols for optimum decoder performance. This symbol scaling is conventionally performed by multiplication with a diagonal scaling matrix wherein the scaling factors are chosen to obtain log likelihood ratios, which is known as log likelihood ratio (LLR) scaling. Considering the equations above, symbols at the equalizer output contain not only disturbance by noise but also by interference from other symbols, thus the noise variance would have to be replaced by the variance of noise plus interference.

An object of the invention is to provide a low-complexity, numerically robust method for compensating interference of received symbols to be supplied to a decoder of a MIMO OFDM receiver which method avoids some of the problems of prior art, A further object of the invention is to provide a low-complexity, low-cost, robust digital baseband receiver for MIMO-OFDM comprising a linear MMSE equalizer.

This object is achieved by a method of compensating interference of received symbols in a multiple-input multiple-output (MIMO) orthogonal frequency division multiplexing (OFDM) receiver, which method includes applying a minimum mean squared error (MMSE) equalization technique and a log likelihood ratio (LLR) scaling technique to received symbols to obtain equalized and scaled symbols to be supplied to a decoder of said OFDM receiver. The novel method is characterized in that said equalization and scaling technique is performed in merged manner by means of a single algorithm which comprises: obtaining a channel matrix (H) from an channel estimator of the receiver; generating an equivalent channel matrix (R) by multiplying said channel matrix (H) with its hermitian ($H^H$); determining an interference compensation matrix (F) from said equivalent channel matrix (R); and generating a product of said interference compensation matrix (F), said hermitian ($H^H$) of the channel matrix (H) and the received symbol vector (y) to obtain said equalized and scaled symbols.

In a preferred embodiment, the latter step of product generation may be performed by first multiplying said interference compensation matrix (F) with said hermitian ($H^H$) of the channel matrix (H), and than multiplying the result thereof with the received symbol vector (y) to obtain said equalized and scaled symbols.

It is also possible for obtaining said equalized and scaled symbols, to first multiply said hermitian ($H^H$) of the channel matrix (H) with the received symbol vector (y) and than multiply said interference compensation matrix (F) with the result of said first operation. This swapped operation sequence will give a similar result, however, it could imply unfavorable bit widths Following common naming convention, an L×M MIMO scenario would describe a transmission channel where L transmit antennas send signals to M receive antennas, In particular for 2×M MIMO, the described merged implementation of a linear MMSE equalization of received symbols and scaling of the corresponding equalized symbols for optimum decoding performance provides a significant reduction of computational complexity while at the same time making the algorithm numerically robust. In contrast to prior art implementations which involve computation of a determinant to solve a matrix inverse no determinant is required according to the invention. The method of the invention allows for a significant simplification compared to separate equalization and scaling. The numerical robustness permits an implementation using fixed-point arithmetic at decent bit widths, rather than using floating-point arithmetic with comparably large bit width mantissae.

In an embodiment of the invention wherein said equivalent channel matrix (R) has a size of 2×2 the said interference compensation matrix (F) is determined according to $$F = \frac{1}{\sigma_n^2} \cdot \begin{bmatrix} 1 & \frac{-r_{1,2}}{r_{2,2} + \sigma_n^2/\sigma_x^2} \\ \frac{-r_{2,1}}{r_{1,1} + \sigma_n^2/\sigma_x^2} & 1 \end{bmatrix},$$

wherein $\sigma_n^2$ n is a variance of the elements of a complex Gaussian noise vector; $\sigma_x^2$ is a variance of the elements of a vector of transmitted symbols; and $r_{k,m}$ is a k-th row/m-th column element in R. By this, the number of multiplications and additions required to perform interference compensation for received symbols of a MIMO OFDM transmission scheme is reduced by a factor of about 2 in comparison known implementations, The invention is useful for all QAM (quadrature amplitude modulation) constellations, or PSK (phase shift keying) in the simplest case.

In another embodiment of the inventive method the transmitted symbols have been modulated by a quadrature amplitude modulation (QAM) higher than QPSK, e.g. 16-QAM, 64-QAM, In this case the method further comprises a step of calculating a product of said equivalent channel matrix (R) and said interference compensation matrix (F) to obtain equivalent channel amplitudes for QAM soft demapping.

The invention further provides a receiver arrangement for receiving signals in a multiple-input multiple-output (MIMO) orthogonal frequency division multiplexing (OFDM) transmission scheme. The receiver comprises a FFT unit adapted to convert received time domain symbols into frequency domain, a channel estimator adapted to estimate transmission channel parameters from the received symbols, a detection unit adapted to apply a minimum mean squared error (MMSE) equalization criterion and a log likelihood ratio (LLR) scaling criterion to received symbols to obtain equalized and scaled symbols, and a deinterleaving/decoding unit adapted to obtain decoded data from said equalized and scaled symbols The receiver arrangement characterized in that said detection unit is adapted to perform both functions of equalization and scaling in a combined equalization/scaling unit that is adapted to perform the method of the invention as set forth above. Such a digital baseband receiver for MIMO OFDM may find application in downlink transmission of the upcoming 3GPP LTE standard.

Additional features and advantages of the present invention will be apparent from the following detailed description of specific embodiments which is given by way of example only and in which reference will be made to the accompanying drawings, wherein:

FIG. 1 shows a simplified schematic block diagram of a part of a baseband receiver for MIMO OFDM in which the proposed merged equalization and scaling according to the invention may be implemented.

Figure 6:
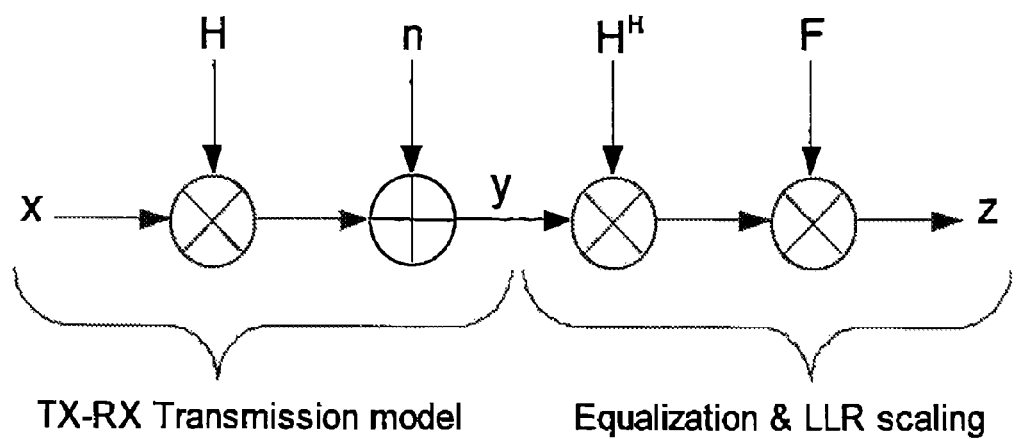
FIG. 6 shows a system model for a single OFDM subcarrier.

A Fast Fourier transform unit 10 converts the time domain signals from a plurality of receive antennas to the frequency domain. For each subcarrier, a vector of received frequency domain symbols, y, may be expressed as follow (note that all vector variables below are column vectors):

$$y = n + H \cdot x \tag{1},$$

wherein:

x is a vector of transmitted symbols comprising random, zero-mean, mutually uncorrelated entries with a variance $\sigma_x^2$;

H is the complex channel matrix having a size of m×l, l being the number of transmission layers and m being the number of receive antennas with m≧l; and n is the complex Gaussian noise vector comprising zero-mean, mutually uncorrelated entries with a variance $\sigma_n^2$, A transmission model for expression (1) is illustrated by the left portion of FIG. 6. A vector of transmit symbols x is multiplied with channel matrix H and then noise n is added to obtain the received vector y.

Figure 1:
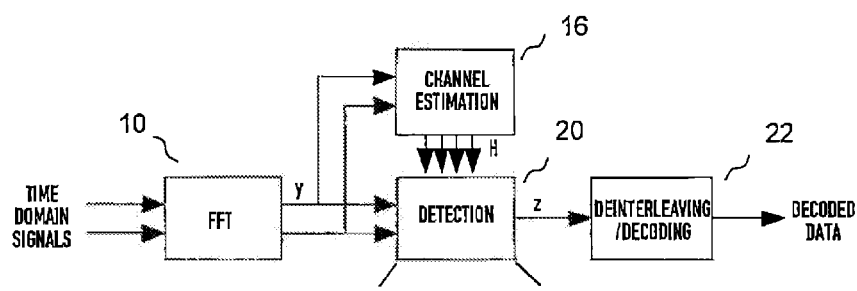
FIG. 1 illustrates a simplified block diagram of a part of an MIMO OFDM receiver in which the invention can be implemented.

A channel estimation unit 16 determines channel coefficients corresponding to the OFDM subcarrier, one per receive (RX) antenna and per transmission layer. FIG. 1 exemplifies the 2×2 MIMO case with two receive vectors being input to and four channel coefficients being output from channel estimation unit. Channel estimation techniques are known in the art and are not part of this invention.

The OFDM subcarriers output from FFT unit 10 and the corresponding channel estimates of the respective subcarriers are used in a detection unit 20 to obtain equalized and scaled symbols for a proper decoding of the transmitted data in deinterleaving/decoding unit 22.

Returning to FIG. 6, what the channel H does to the constellation of transmitted symbols, i.e. what goes on at the transmission path, may be described as kind of a rotational dilation of the constellation. Detection unit 20 both has to compensate for this rotational dilation to get a noisy but otherwise correct constellation, and has to compensate for interference terms.

Figure 3:
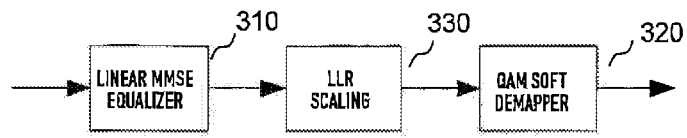
FIG. 3 shows an alternative known detection scheme of a receiver such as shown in FIG. 1.
Figure 4:
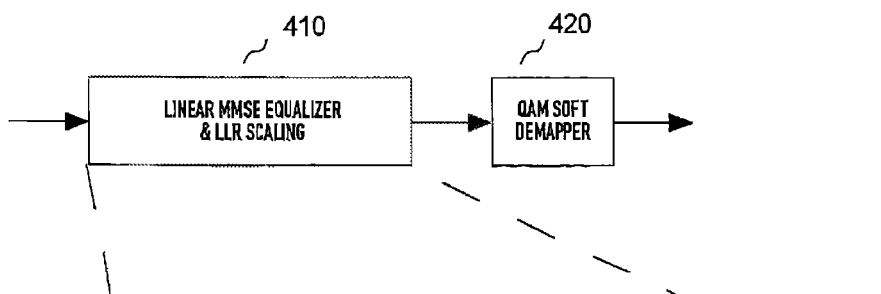
FIG. 4 illustrates a detection scheme according to the invention.

Detection unit 20 performs equalization on a per-subcarrier basis, scaling of the equalized symbols, and, in case of a QAM constellation of 16-QAM or higher, QAM (quadrature amplitude modulation) demapping. QPSK (quadrature phase shift keying), does not require QAM demapping so QAM demappers 220, 320 or 420 as shown in FIGS. 2 to 4, respectively, would not be required in the QPSK case.

Figure 2:
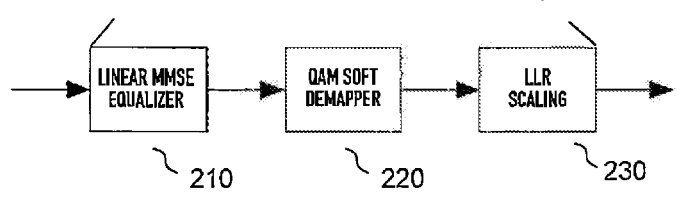
FIG. 2 shows a prior art detection scheme of a receiver such as shown in FIG. 1.

FIG. 2 shows a prior art implementation of detection unit 20 which employs a linear MMSE equalizer 210, the operation thereof will be shown in detail below. Downstream MMSE equalizer 210 is QAM soft demapper 220 which extracts soft bits from the QAM constellation which soft information is then scaled in LLR scaling unit 230 to obtain appropriate soft bits that allow to achieve the best possible decoding result in deinterleaving/decoding unit 22, FIG. 3 shows another prior art implementation of detection unit 20 in which LLR scaling 330 is performed immediately following MMSE equalization 310, and QAM soft demapping 320 follows afterwards. This swapping of LLR scaling and QAM soft demapping as compared to FIG. 2 is possible because both units perform essentially linear operations, QAM soft demapping is known in the art and is not part of this invention.

Linear MMSE equalizers 210 and 310 perform equalization of the vectors y of received symbols to obtain a vector of equalized symbols, v, according to:

$$v = E \cdot y \quad (2),$$

where E is an equalizer matrix which can be expressed as follows:

$$E = \left( \frac{\sigma_n^2}{\sigma_x^2} \cdot I + H^H \cdot H \right)^{-1} \cdot H^H \quad (3)$$

with I being an identity matrix.

Expression (3) for the equalizer matrix holds under the assumption that the noise vector n is uncorrelated at constant variance, which is achieved by applying a spatial noise whitening filter prior to equalization. The most general form of the equalizer matrix is $$E = H^H \cdot \left( \frac{1}{\sigma_x^2} \cdot \Phi_{nn} + H \cdot H^H \right)^{-1}, \quad (4)$$

with $\Phi_{nn}$ being the general noise covariance matrix.

Note that both (3) and (4) contain a matrix inverse, whose computation is numerically demanding and requires complex hardware, which translates into large silicon area and large energy consumption in an integrated realization, as has been discussed above and abundantly in literature.

LLR scaling in units 230 and 330 obtain a vector of equalized and scaled symbols, z, with $$z = \text{diag}(s) \cdot v \quad (5),$$

wherein s is a vector of scaling values and diag(s) is a diagonal matrix, $s = [s_1 s_2 \ldots s_m]^T$, where the elements in scaling vector s are calculated as:

$$s_l = \frac{\sum_{k=1}^{l} e_{l,k} \cdot h_{k,l}}{\sigma_n^2 \cdot \sum_{k=1}^{l} |e_{l,k}|^2 + \sigma_x^2 \cdot \sum_{p \in \{1,m\} \setminus \{l\}} \left| \sum_{k=1}^{l} e_{l,k} \cdot h_{k,p} \right|^2}. \quad (6)$$

The above expressions (2) to (6) are a basis for any existing MMSE detection implementation.

FIG. 4 shows the method of the invention, where the MMSE equalization and LLR scaling is implemented in a merged detection unit 410, followed, as required, by QAM soft demapping in unit 420.

In contrast to any known implementations, detection unit 410 does not perform MMSE equalization and LLR scaling separately, but in a single merged algorithm which, for the 2×M MIMO case, completely avoids computationally extensive matrix inversion at the expense of not seeing any equalized symbols, v, as an intermediate result before the scaling step. Actually, traditional thinking has always been to see the constellation following equalization, i.e. the detection step that implies the most complexity. The scaling operation afterwards, being merely a simple multiplication with a scalar, has always been considered separately from equalization, either following demapping or prior to demapping. It has been realized by the inventors that an intermediate result, v, could be dispensed with, and this with negligible trade-off as to the overall error rate, but for the benefit of a significant simplification of the detection algorithm for the 2×M MIMO case, which both reduces implementation complexity and makes the algorithm numerically robust as it does no longer require computation of determinants.

The proposed merged implementation of MMSE equalization and LLR scaling that for the 2×M MIMO case completely eliminates matrix inversion obtains a vector of equalized and scaled symbols, z, directly from the received symbols as follows:

$$z = F \cdot H^H y \quad (7).$$

In this expression, $H^H$ is the hermitian of channel matrix H and F is an interference compensation matrix which is defined by analytical simplification of $$F = \text{diag}(s) \cdot \left( \frac{\sigma_n^2}{\sigma_x^2} \cdot I + H^H \cdot H \right)^{-1}. \quad (8)$$

In particular, elements in F are defined as set forth below using a matrix R which is also known as an equivalent channel matrix, $$R = H^H \cdot H \quad (9),$$

with $r_{k,m}$ being the k-th row/m-th column element in R: In case the size of R is 2×2 the interference compensation matrix is;

$$F = \frac{1}{\sigma_n^2} \cdot \begin{bmatrix} 1 & \frac{-r_{1,2}}{r_{2,2} + \sigma_n^2/\sigma_x^2} \\ \frac{-r_{2,1}}{r_{1,1} + \sigma_n^2/\sigma_x^2} & 1 \end{bmatrix}. \quad (10)$$

As a result, implementation complexity, i.e, the number of multiplications and additions needed, is reduced to about one half of any prior art implementations that employ matrix inversion. While prior art implementations involve high dynamic range computation with differences of powers of 4, what is needed in the inventive method are at most powers of two and no differences, For larger R matrix sizes than 2×2, the main diagonal elements in the resulting interference compensation matrix F are also $$\frac{1}{\sigma_n^2},$$

but the side diagonal elements become more complex expressions, with the highest polynomial order of the occurring terms being one less than the matrix size, e.g. with a matrix size of 4×4 the highest polynomial order would be 3, There exists complexity reduction potential by exploiting statistical properties of the polynomial terms.

Figure 5:
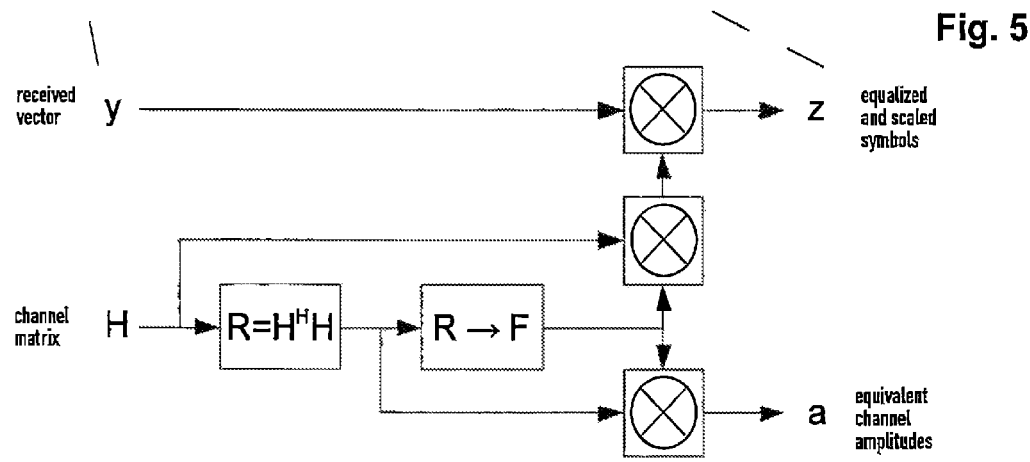
FIG. 5 shows a detailed bock diagram of an equalizer according to the invention.

The inventive method of merged implementation of MMSE equalization and LLR scaling avoids matrix inversion in the 2×M MIMO case. It merely involves scalar quotients that have to be computed, but these are numerically harmless, due to the statistical distribution of the result, FIG. 5 illustrates the inventive method in detail. Channel matrix H is first multiplied by its hermitian $H^H$ to obtain a matrix R which is known as an equivalent channel matrix. Then, elements in R are converted into scaling matrix F. Finally F is used to scale the original channel matrix H and multiply the result with the received vector y to obtain an equalized and scaled vector z. Furthermore, F is multiplied with R, and the main diagonal elements a of the result are provided to the QAM demapper along with the equalized and scaled vector z as an amplitude information for QAM demapping.

A system model for a single OFDM subcarrier is shown on the right half of FIG. 6. The received vector is multiplied with the hermitian $H^H$ of channel matrix H, and the result thereof is multiplied with equalizing and scaling matrix F, to obtain an equalized and scaled vector z, which will be supplied to QAM demapper 420, as appropriate, and after that to deinterleaver/decoder 22.

Herein, $H^H$, can be understood as a matched filter with respect to the channel matrix H, in analogon to the scalar case, i.e. SISO (single input single output, wherein the received symbols are multiplied by a MMSE filter f which is a scalar value, with $$f = \frac{h^*}{|h|^2 + \frac{\sigma_n^2}{\sigma_x^2}}, \quad (11)$$

h* being the inverse conjugate of the channel function h. To get appropriate LLR values at the input of the decoder for a proper decoding what has to be done is to adequately scale the filtered symbols such that $$f \cdot s = \frac{h^*}{\sigma_n^2}$$

holds, i.e. the product of the MMSE filter f and a scaling factor s has to be equal to a quotient of h* and the noise variance $\sigma_n^2$, which may be called a "matched filter".

In contrast and in addition to the SISO case, the equalizer in MIMO case has to compensate for interference terms, So, the detection unit of the invention can be understood as comprising a matched filter $H^H$ and a correction matrix which is actually an interference compensation matrix.

The present invention will advantageously be employed in future baseband receivers for 3GPP LTE user equipment.

The invention claimed is:

1. A method of compensating interference of received symbols in a multiple-input multiple-output (MIMO) orthogonal frequency division multiplexing (OFDM) receiver, which method includes:
   applying a minimum mean squared error (MMSE) equalization technique and a log likelihood ratio (LLR) scaling technique to received symbols vector (y) to obtain equalized and scaled symbols to be supplied to a decoder of said OFDM receiver,
   said equalization and scaling performed in merged manner by means of a single algorithm which comprises:
      obtaining a channel matrix (H) from a channel estimator of the receiver;
      generating an equivalent channel matrix (R) by multiplying said channel matrix (H) with its hermitian ($H^H$);
      determining an interference compensation matrix (F) from said equivalent channel matrix (R); and
      generating a product of said interference compensation matrix (F), said hermitian ($H^H$) of the channel matrix (H) and the received symbol vector (y) to obtain said equalized and scaled symbols.

2. The method of claim 1 wherein the generating the product comprises multiplying said interference compensation matrix (F) with said hermitian ($H^H$) of the channel matrix (H), and multiplying the result thereof with the received symbol vector (y) to obtain said equalized and scaled symbols.

3. The method of claim 2 wherein the received symbols have been modulated by a quadrature amplitude modulation (QAM) of 16-QAM or higher and the method further comprises a step of calculating a product of said equivalent channel matrix (R) and said interference compensation matrix (F) to obtain equivalent channel amplitudes for QAM soft demapping in said OFDM receiver.

4. The method of claim 1 wherein the generating the product comprises multiplying said hermitian ($H^H$) of the channel matrix (H) with the received symbol vector (y) and multiplying the result thereof with said interference compensation matrix (F) to obtain said equalized and scaled symbols.

5. The method of claim 1 wherein said equivalent channel matrix (R) has a size of 2×2 and the method comprises determining said interference compensation matrix (F) according to:

$$F = \frac{1}{\sigma_n^2} \cdot \begin{bmatrix} 1 & \frac{-r_{1,2}}{r_{2,2} + \sigma_n^2/\sigma_x^2} \\ \frac{-r_{2,1}}{r_{1,1} + \sigma_n^2/\sigma_x^2} & 1 \end{bmatrix},$$

wherein $\sigma_n^2$; is a variance of the elements of a complex Gaussian noise vector; $\sigma_n^2$; is a variance of the elements of a vector of transmitted symbols; and $r_{k,m}$ is a k-th row/m-th column element in the equivalent channel matrix R.

6. The method of claim 1 wherein the received symbols have been modulated by a quadrature amplitude modulation (QAM) of 16-QAM or higher and the method further comprises a step of calculating a product of said equivalent channel matrix (R) and said interference compensation matrix (F) to obtain equivalent channel amplitudes for QAM soft demapping in said OFDM receiver.

7. A receiver arrangement for receiving signals in a multiple-input multiple-output (MIMO) orthogonal frequency division multiplexing (OFDM) transmission scheme, comprising:
   a FFT unit adapted to convert received time domain symbols into frequency domain;
   a channel estimator adapted to estimate transmission channel parameters from the received symbols;
   a detection unit adapted to apply a minimum mean squared error (MMSE) equalization criterion and a log likelihood ratio (LLR) scaling criterion to received symbol vector (y) to obtain equalized and scaled symbols, and
   a deinterleaving/decoding unit adapted to obtain decoded data from said equalized and scaled symbols,
   wherein said detection unit is adapted to perform both functions of equalization and scaling in a combined equalization/scaling unit that is adapted to perform a single algorithm which comprises:
   obtaining a channel matrix (H) from the channel estimator of the receiver;
   calculating an equivalent channel matrix (R) by multiplying said channel matrix (H) with its hermitian ($H^H$);
   determining an interference compensation matrix (F) from said equivalent channel matrix (R);
   generating a product of said interference compensation matrix (F), said hermitian ($H^H$) of the channel matrix (H) and the received symbol vector (y) to obtain said equalized and scaled symbols.

8. The receiver arrangement of claim 7 which is arranged to receive OFDM symbols of a 2×2 MIMO transmission scheme that comprises two transmission layers and two receive antennas wherein the receiver is adapted to determine said interference compensation matrix (F) according to:

$$F = \frac{1}{\sigma_n^2} \cdot \begin{bmatrix} 1 & \frac{-r_{1,2}}{r_{2,2} + \sigma_n^2/\sigma_x^2} \\ \frac{-r_{2,1}}{r_{1,1} + \sigma_n^2/\sigma_x^2} & 1 \end{bmatrix},$$

wherein $\sigma_n^2$; is a variance of the elements of a complex Gaussian noise vector; $\sigma_n^2$; is a variance of the elements of a vector of transmitted symbols; and $r_{k,m}$ is a k-te row/m-th column element in said equivalent channel matrix R.

9. The receiver arrangement according to claim 8 further comprising a quadrature amplitude modulation (QAM) soft demapper for a quadrature amplitude modulation (QAM) scheme of 16-QAM or higher adapted to receive said equalized and scaled symbols and further receive equivalent channel amplitudes from said equalization/scaling unit and to provide demapped symbols to said deinterleaving/decoding unit.

10. The receiver arrangement according to claim 7 further comprising a quadrature amplitude modulation (QAM) soft demapper for a quadrature amplitude modulation (QAM) scheme of 16-QAM or higher adapted to receive said equalized and scaled symbols and further receive equivalent channel amplitudes from said equalization/scaling unit and to provide demapped symbols to said deinterleaving/decoding unit.

* * * * *

UNITED STATES PATENT AND TRADEMARK OFFICE
CERTIFICATE OF CORRECTION

| | | |
|---|---|---|
| PATENT NO. | : 8,379,743 B2 | Page 1 of 1 |
| APPLICATION NO. | : 12/875693 | |
| DATED | : February 19, 2013 | |
| INVENTOR(S) | : Andreas Bury | |

It is certified that error appears in the above-identified patent and that said Letters Patent is hereby corrected as shown below:

Column 10, Line 28: Claim 8, Delete "k-te" and insert --k-th--

Signed and Sealed this
Second Day of April, 2013

Teresa Stanek Rea
*Acting Director of the United States Patent and Trademark Office*